Sept. 8, 1925.
H. J. SLOWEY
ROAD GUIDE
Filed Aug. 1, 1923
1,553,194
3 Sheets-Sheet 1
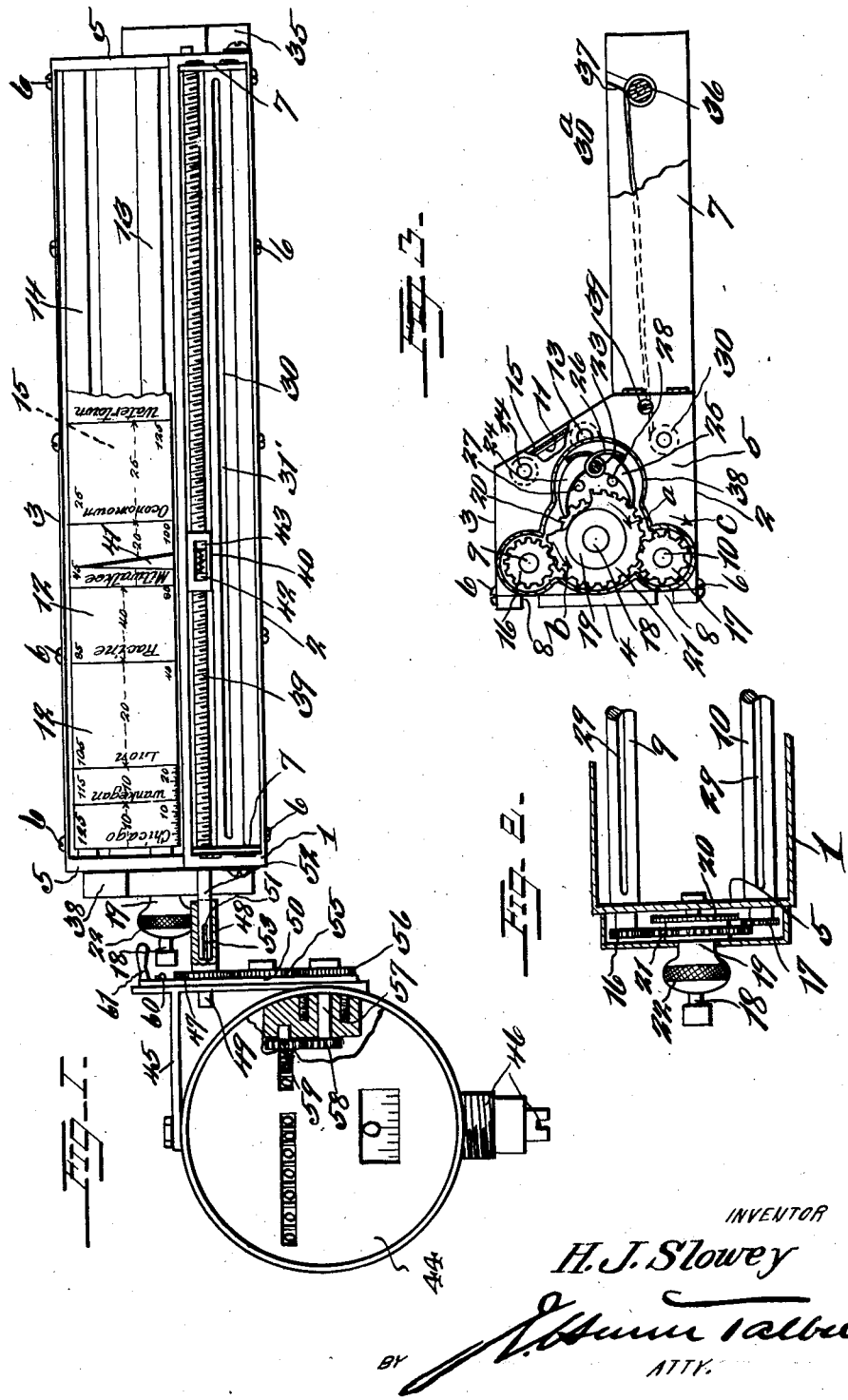
INVENTOR
H. J. Slowey
BY
ATTY.

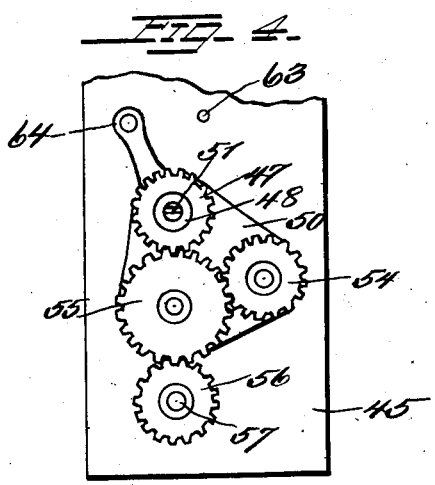
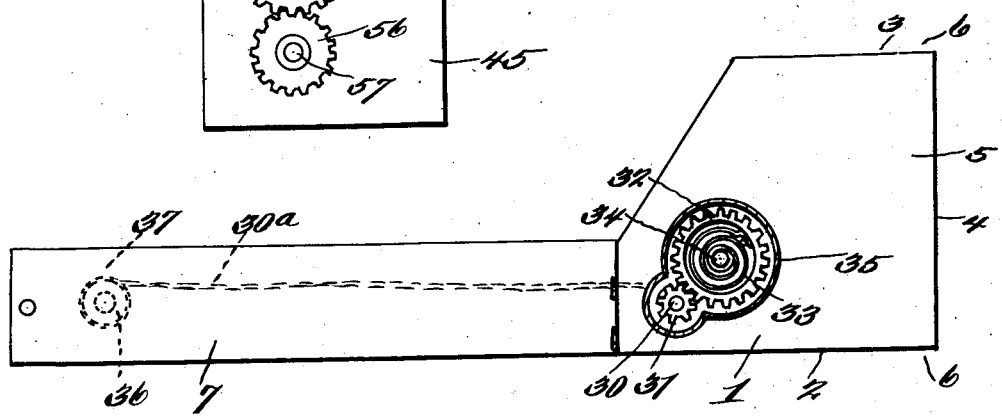
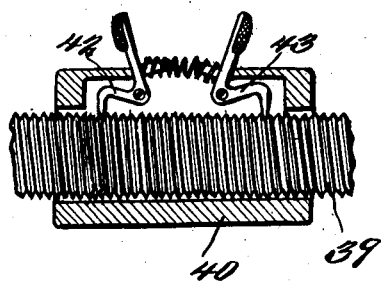
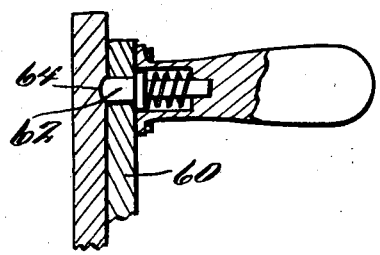

Sept. 8, 1925.
H. J. SLOWEY
ROAD GUIDE
Filed Aug. 1, 1923
1,553,194
3 Sheets-Sheet 3
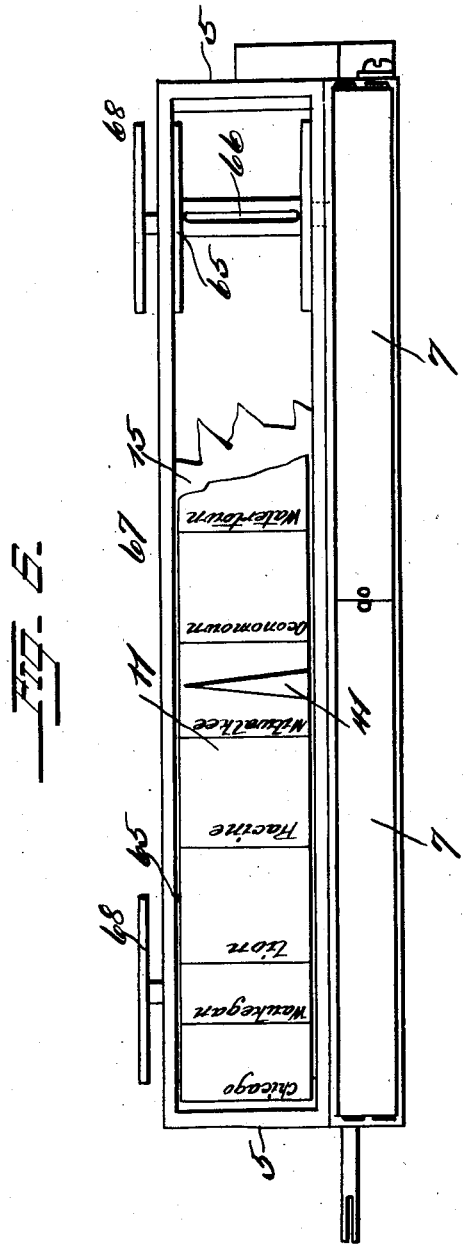
INVENTOR
H.J.Slowey
ATTY.

Patented Sept. 8, 1925.

1,553,194

UNITED STATES PATENT OFFICE.

HERBERT J. SLOWEY, OF PORTAGE, WISCONSIN.

ROAD GUIDE.

Application filed August 1, 1923. Serial No. 655,079.

*To all whom it may concern:*

Be it known that HERBERT J. SLOWEY, a citizen of the United States, residing at Portage, in the county of Columbia and State of Wisconsin, has invented new and useful Improvements in Road Guides, of which the following is a specification.

It is the purpose of the present invention to provide, in a road guide, a structure including and displaying road maps for the guidance of tourists by automobiles or other means of transportation in order to indicate continuously to the driver the direction, extent of progress and landmarks in following a predetermined route.

Another purpose is to provide means by which the driver may, at any given time, determine the approximate location of the vehicle when comparing the location of an indicator with respect to a road map, the former being timed to accord with the progress of the vehicle during its travel across the map.

Still another purpose is the provision of means operatively connecting the movable indicator and a speedometer, whereby the driver may be assured as to the location of the vehicle by merely observing the location of the indicator with respect to the map.

A further purpose is the provision of means for manipulating the road map whereby various routes may be presented according to the choice of the tourist. In order to accomplish this result, the road map is movable in either direction by simply operating one knob which is so connected to the rolls on which the map is mounted as to operate the rolls in either direction.

A still further purpose is the provision of a general map carried by the apparatus presenting various routes of a certain section of country, said general map being carried by a spring tensioned roller, whereby the map may be automatically rewound when not in use.

The invention comprises further features and combinations of parts to be hereinafter set forth, shown in the drawings and claimed.

In the drawings:

Figure 1 is a view in elevation of the improved road guide constructed in accordance with the invention, showing the connection between the indicator and the speedometer, with parts of said connection in section, with hinged doors swung open displaying the location of the general map and the roller on which it is reeled.

Figure 2 is a sectional view through one end of the road guide, more particularly showing the gearing operative by a single knob for reversing the movement of the road map.

Figure 3 is an end view of the road guide showing the cover or housing which encloses the gearing in section to disclose the gearing.

Figure 4 is a detail view in elevation showing the gearing to be operated for reversing the movement of the indicator.

Figure 5 is a view in elevation of the opposite end of the road guide showing the general map extended and the housing in section to disclose the tensioning means for the roller on which the general map winds.

Figure 6 is a view in elevation of a modified form of road guide wherein the road map is in the form of a narrow strip passing from a reel at one end of the frame to a reel at the other end.

Figure 7 is a detail view of the spring clips for holding the sleeve of the indicator in different adjusted positions on a feeding screw.

Figure 8 is a detail sectional view illustrating the latching means for the direction changing drive of the indicator.

Referring to the drawings, 1 designates a frame which may be of any suitable shape and proportions, preferably rectangular. The frame comprises a bottom 2, a top 3 and a back 4 which is inserted between the ends 5 and the top and bottom pieces 2 and 3. The back is removably secured in place by means of screws 6. The lower portion of the front of the frame includes a pair of closures or doors 7 which are hingedly mounted on the forward edges of the end pieces 2 of the frame.

Mounted in bearing slots 8 of the end pieces 2 are rollers 9 and 10 about which a road map 11 winds. In fact, the road map has its opposite ends connected to the rollers and adapted to wind from one roller to the other. The face of the map is provided with a plurality of routes disposed transversely, each route comprising a plurality of spaces 12 indicating the distance between towns or cities and other localities. The road map also passes over the guide rolls 13 and 14 whereby the face of the map may travel under a glass 15 which is conveniently supported in an inclined position adjacent the front of the frame.

Corresponding ends of the rollers 9 and 10 have gears 16 and 17. A stub shaft 18 is mounted axially in a bearing of one end of the frame. Journaled slidably upon the stub shaft 18 is a hub body 19 including gears 20 and 21 and a knob 22. When the hub body is moved outwardly and axially on the shaft 18, the gear 21 meshes with the gear 16 and when the hub body is moved inwardly toward the end of the frame, the gear 21 meshes with the gear 17. In fact, the gear 21 may mesh with first one and then the other of the gears 16 and 17, it depending entirely upon whether the road map is wound upon the roller 9 or upon the roller 10.

A stud 23 is carried by one end of the frame and mounted upon the stud is a pair of ratchet dogs 24 and 25. The dog 25 is disposed adjacent the outer face of the dog 24, in fact, in a position so that its nose may engage the teeth of the gear 21 to prevent rotation of the gear in one direction but permit rotation of the gear in the opposite direction. The dog 24 is disposed so that when the hub body is moved inwardly toward the frame, the nose of the dog 24 will engage the teeth of the gear 20 to prevent rotation thereof in one direction and allow rotation in the opposite direction.

Referring to Figures 2 and 3, it will be noted that the hub body assumes a position outwardly upon the stub shaft and in this case the gear 21 meshes with the gear 16. By turning the knob 22 in the direction of the arrow $a$ in Figure 3, revoluble movement will be imparted to the roller 9, causing the road map to wind upon said roller and unwind from the roller 10. When the knob 22 and the hub body are moved toward the end of the frame, the gear 21 will mesh with the gear 17 and disengage from the gear 16. When in this position, the dog 25 remains idle and the dog 24 will then engage with the teeth of the gear 20. The knob 22 is then reversed in its rotation, causing the gear 21 to move in the direction of the arrow $b$, imparting movement to the roller 10 in the direction of the arrow $c$ so as to wind the road map upon the roller 10 and unreel the map from the roller 9. When the gear 21 moves in the direction of the arrow $b$, the dog 24 merely rides over the teeth of the gear 20 to permit movement of the gear 20 and the hub body in the opposite direction.

The stub 23 (which supports the dogs 24 and 25) also carries a spring 26, the end portions of which bear upon the dogs to hold them in contact with the lugs or pins 27 and 28. These lugs or pins act to limit the dogs in their movements toward the gear 20. In other words, when the gear 20 is out of engagement with the dog 24, said dog may be supported in proper position to again engage with the teeth of the gear. When the gear 20 is moved inwardly and its teeth are engaged by the dog 24, the dog 25 is supported by the lug or pin 28. The rollers 9 and 10 have longitudinally disposed slots 29 in which the end portions of the road map are secured.

Journaled in bearings of the ends of the frame is a roller 30 which is also provided with a slot 31' in which the end of a general map $30^a$ is secured. The general map is adapted to wind about the roller 30. One end of the roller 30 carries a gear 31 which meshes with a gear 32. The gear 32 is larger in diameter than the gear 31 and its body houses a spring 33. The arrangement and construction of the spring 33 are such as to tension the gear 32 so as to cause the gear to operate the gear 31 and the roller 30 for the purpose of rewinding the general map. The gear 32 is mounted upon a stub shaft 34 which is carried by one end of the frame. A suitable housing 35 encloses the gears 31 and 32 to preclude dust and other foreign matter.

The other end of the general map is connected to a roller 36 which, when the general map is wound upon the roller 30, is supported upon the bottom of the frame with the doors 7 closed. When it is desired to use the general map, the doors 7 are moved to open positions, then the roller 36, while supported in one hand, is rotated by the other hand until the proper route or the proper portion of the general map is disclosed, then the pintles of the roller 36 are disposed to engage with the slots 37 formed on the inner faces of the ends of the doors 7, thereby holding the general map in an extended position. A suitable housing 38 is mounted upon one end of the frame for enclosing the dogs 24 and 25 and the gears 16 and 17 and 20 and 21.

Journaled in bearings of the ends of the frame is a feed screw 39 on which a sleeve 40 is mounted for movement from one end of the frame to the other. The sleeve 40 carries an indicator 41 which is adapted to move transversely of the road map but longitudinally of each route. The sleeve 40 is provided with a pair of spring clips 42 and 43 which engage through the sleeve and also engage with the threads of the feed screw 39. Obviously, by rotating the feed screw in one direction or the other, the sleeve 40 will travel longitudinally of the frame and, since it carries the indicator 41, it will travel longitudinally of the route on the road map. It is possible to simply press the spring clips 42 and 43 together, disengaging certain of their ends from the threaded feed screw 39, whereby the sleeve may be moved or adjusted in different positions with respect to the screw.

A conventional form of speedometer 44 may be provided, there being an angular frame 45 carried by the side of the casing of the speedometer. The speedometer may be connected at 46 with one of the supporting wheels of the vehicle. A gear 47 with a sleeve 48 has its stub shaft 49 journaled in a bearing of the frame 45. A plate 50 is journaled upon the stub shaft 49 of the gear 47. The sleeve 48 of the gear 47 has a transverse pin 51 which, when the sleeve telescopically fits the extension 52 of the feed screw 39, engages a slot 53 in the end of the extension 52. This connection is provided so that, when the gear 47 rotates, it will impart movement to the feed screw 39.

The plate 50 is capable of oscillatory movements on the stub of the gear 47 and carries the gears 54 and 55. In Figure 4, the gear 54 is shown in mesh with a gear 56 which is movable with a shaft 57 which operatively connects with the speedometer mechanism (not shown) through the medium of the gears 58 and 59. The plate 50 has an extension 60 provided with a handle 61 by which the plate 50 may be oscillated upon the stub shaft 49. The handle 61 has a spring tensioned pin 62 which engages with one or the other of the depressions 63 or 64 for holding the plate 50 in different positions. When the plate 50 is moved to a position whereby the gear 54 may mesh with the gear 56, the speedometer operates the feed screw 39 through the medium of the gears 56, 54, 55 and 47, thereby causing the sleeve 40 to travel toward the right with the indicator 41 moving toward the right over the road map. Obviously, since the indicator is operatively connected with the speedometer, the driver may very easily ascertain the location of the vehicle between any two predetermined points by observing the location of the indicator with respect to the road map.

After the driver has reached the destination, the plate 50 may be moved pivotally upon the stub shaft to cause the gear 55 to mesh with the gear 56 which will impart reverse revoluble movement to the feed screw 39 and cause the indicator to traverse the road map to the left. In this case, the driver may at any time on the return trip ascertain the location of the vehicle by merely observing the position of the indicator with respect to the route of the road map. After the driver has reached the destination and if it is desired to make the return trip by way of another route, the road map is adjusted to present through the glass this other route and in this case reverse movement of the feed screw is unnecessary. However, the spring clips are pressed together, causing their corresponding ends to disengage from the threads of the screw, whereby the sleeve 40 may be adjusted manually adjacent the left hand end of the feed screw so that the indicator may traverse over the other route.

In Figure 6, the road guide is practically the same as in the previous figures with the exception that the road map is narrow and is secured to and wound upon reels 65, the hubs of which have slots 66 in which the opposite ends of the road map are secured. In this construction, the road map is in the form of a narrow strip disposed to travel longitudinally of the frame 67. The extensions of the reels 65 have hand wheels 68 by which the reels 65 may be rotated for feeding the road map from one end of the frame to the other.

It will be noted that the map 11 consist of a web or tape of uniform width and that the route is plotted or mapped on straight lines, thus providing for its being easily read and comprehended.

The invention having been set forth, what is claimed is:

1. A route indicating apparatus for tourists including a housing, a route sheet, a pair of rollers in the housing and operatively supporting the route sheet for progressive movement, roller actuating means axially shifted and manually operated for communicating movement to either of the rollers, and spring held pawls operatively related with said rollers and operatively engaged with one to prevent movement in one direction when the other roller is engaged with the actuating means.

2. A route indicating apparatus for tourists including a housing, a route sheet, a pair of rollers in the housing and operatively supporting the route sheet for progressive movement, roller actuating means axially shifted and manually operated for communicating movement to either of the rollers, spring-held pawls operatively related with said rollers and operatively engaged with one to prevent movement in one direction when the other roller is engaged with the actuating means, an indicator enclosed by the housing and traversing the route sheet, a feed screw supporting the indicator, and means automatically actuated for operating the feed screw, said last named means including shiftable means for reversing the movement of the feed screw.

3. A route indicating apparatus for tourists including a housing, a route sheet, a pair of rollers in the housing and operatively supporting the route sheet for progressive movement, an indicator for traversing the route sheet, a feed member supporting the indicator for operating the same, means automatically actuated for operating the feed member, said feed member actuating means including a device for shifting certain members of said feed actuating means for reversing the movement of the feed member, roller actuating means axially shifted and manually operated for communicating movement to either of the rollers, and tensioned elements operatively related with said rollers and operatively engaged with one roller to prevent movement in one direction when the other roller is engaged with the actuating means.

4. A route indicating apparatus for tourists including a progressively movable route sheet provided with data with reference to landmarks, directions, distances and the like, an indicator, means for supporting the route sheet, a housing for the route sheet, its supporting means and the indicator, a rotating element supporting the indicator and causing it to traverse the route sheet, and a mechanism automatically actuated and including a device concentric with the element and shiftable for reversing the movement of the element.

5. A route indicating apparatus for tourists including a progressively movable route sheet provided with data with reference to landmarks, directions, distances and the like, an indicator, means for supporting the route sheet, a housing for the route sheet, its supporting means and the indicator, a rotating element supporting the indicator and causing it to traverse the route sheet, a mechanism automatically actuated and including a device concentric with the element and shiftable for reversing the movement of the element, said route sheet supporting means comprising a pair of rollers with actuating means axially shifted and manually operated for communicating movement to either of the rollers, and tensioned devices operatively related with said rollers and operatively engaged with one to prevent movement in one direction when the other roller is engaged with said actuating means.

In testimony whereof he affixes his signature.

HERBERT J. SLOWEY.